United States Patent
Terai

(10) Patent No.: US 10,890,250 B2
(45) Date of Patent: Jan. 12, 2021

(54) CONTROL APPARATUS OF CONTINUOUSLY VARIABLE TRANSMISSION, CONTINUOUSLY VARIABLE TRANSMISSION, AND METHOD OF CONTROLLING CONTINUOUS VARIABLE TRANSMISSION

(71) Applicant: SUBARU CORPORATION, Tokyo (JP)

(72) Inventor: Koichiro Terai, Tokyo (JP)

(73) Assignee: SUBARU CORPORATION, Tokyo (JP)

(*) Notice: Subject to any disclaimer, the term of this patent is extended or adjusted under 35 U.S.C. 154(b) by 125 days.

(21) Appl. No.: 16/210,054

(22) Filed: Dec. 5, 2018

(65) Prior Publication Data
US 2019/0242474 A1 Aug. 8, 2019

(30) Foreign Application Priority Data
Feb. 8, 2018 (JP) ................. 2018-020956

(51) Int. Cl.
*B60W 10/107* (2012.01)
*F16H 61/12* (2010.01)
(Continued)

(52) U.S. Cl.
CPC ............. *F16H 61/12* (2013.01); *B60W 10/04* (2013.01); *B60W 10/107* (2013.01);
(Continued)

(58) Field of Classification Search
CPC ........... Y10T 477/624; Y10T 477/6242; Y10T 477/6243; B60W 50/0225; B60W 50/035;
(Continued)

(56) References Cited

U.S. PATENT DOCUMENTS

2017/0254412 A1* 9/2017 Inoue ..................... F16H 9/18
2018/0080548 A1* 3/2018 Ozono .................... F16H 61/12
(Continued)

FOREIGN PATENT DOCUMENTS

| JP | H01-95943 A | 4/1989 |
| JP | 2007-100745 A | 4/2007 |
| JP | 2012-72844 A | 4/2012 |

*Primary Examiner* — Roger L Pang
(74) *Attorney, Agent, or Firm* — Troutman Pepper Hamilton Sanders LLP

(57) ABSTRACT

A control apparatus of a continuously variable transmission includes a shifting controller and a detector. The continuously variable transmission includes a hydraulic pressure supplier and a continuously variable transmission unit. The continuously variable transmission unit is able to perform continuously variable shifting by a hydraulic pressure in the hydraulic pressure supplier. The shifting controller causes, when the detector detects an abnormality, the hydraulic pressure in the hydraulic pressure supplier to fall within a range that is equal to or greater than a first value and less than a second value. The first value is a value at which minimal operation performed by the continuously variable transmission unit is available. The second value is a value upon normal operation before the detector detects the abnormality.

20 Claims, 4 Drawing Sheets

(51) Int. Cl.
*B60W 10/04* (2006.01)
*F16H 61/14* (2006.01)
*F16H 61/662* (2006.01)
*B60W 50/02* (2012.01)
B60W 50/038 (2012.01)
B60W 50/035 (2012.01)

(52) U.S. Cl.
CPC ......... *B60W 50/0225* (2013.01); *F16H 61/14* (2013.01); *F16H 61/662* (2013.01); *B60W 50/035* (2013.01); *B60W 50/038* (2013.01); F16H 2061/1208 (2013.01); F16H 2061/66204 (2013.01); F16H 2061/66295 (2013.01); Y10T 477/624 (2015.01); Y10T 477/6242 (2015.01); Y10T 477/6243 (2015.01)

(58) Field of Classification Search
CPC .. B60W 50/038; B60W 10/04; B60W 10/107; F16H 61/12; F16H 61/14; F16H 61/662; F16H 2061/1208; F16H 2061/66204; F16H 2061/1232; F16H 61/702
USPC ...................................... 701/61, 63
See application file for complete search history.

(56) References Cited

U.S. PATENT DOCUMENTS

2018/0245686 A1* 8/2018 Hamano ................. F16H 61/12
2018/0245687 A1* 8/2018 Ozono .................... F16H 59/40
2018/0283541 A1* 10/2018 Sudo ....................... F16H 59/40

* cited by examiner

CONTROL APPARATUS OF CONTINUOUSLY VARIABLE TRANSMISSION, CONTINUOUSLY VARIABLE TRANSMISSION, AND METHOD OF CONTROLLING CONTINUOUS VARIABLE TRANSMISSION

CROSS-REFERENCE TO RELATED APPLICATIONS

The present application claims priority from Japanese Patent Application No. 2018-020956 filed on Feb. 8, 2018, the entire contents of which are hereby incorporated by reference.

BACKGROUND

The technology relates to a continuously variable transmission to be included in a power feeding system of a structure such as a vehicle, a control apparatus of the continuously variable transmission, and a method of controlling the continuously variable transmission.

In a continuously variable transmission to be included in a structure such as a vehicle, a control unit of the vehicle calculates a target shifting ratio on the basis of detection signals derived from various sensors such as a revolution sensor. In the continuously variable transmission, shifting operation of the vehicle is so performed by means of, for example, a hydraulic fluid as to cause a shifting ratio of the vehicle to come close to the target shifting ratio.

Japanese Unexamined Patent Application Publication (JP-A) No. H01-95943 describes a technique of avoiding a sudden downshift by minimizing a hydraulic pressure (e.g. a line pressure) when an error of an actuator such as a solenoid valve occurs. The solenoid valve converts an electric control signal derived from a control unit into the hydraulic pressure.

JP-A No. 2007-100745 describes a technique of avoiding an overload in a continuously variable transmission when an abnormality in communication occurs between an engine control unit and a control unit of the continuously variable transmission. This technique is performed by controlling torque generated by an engine to equal to or less than a predetermined value and further controlling a line pressure in the continuously variable transmission.

JP-A No. 2012-72844 describes a technique of reducing a pressure of a line pressure control valve, to thereby cause a shifting ratio in the continuously variable transmission to come close to 1.0, even when electric power supply to all of the solenoid valves in a hydraulic pressure circuit of a belt-type continuously variable transmission becomes disabled.

SUMMARY

An aspect of the technology provides a control apparatus of a continuously variable transmission. The continuously variable transmission includes a hydraulic pressure supplier and a continuously variable transmission unit. The hydraulic pressure supplier contains a hydraulic fluid. The continuously variable transmission unit is configured to be able to perform continuously variable shifting by a hydraulic pressure in the hydraulic pressure supplier. The control apparatus is configured to control the continuously variable transmission. The control apparatus includes: a shifting controller including a setting unit that is configured to set a target shifting ratio of the continuously variable transmission unit on a basis of driving information of a vehicle on which the continuously variable transmission unit is to be mounted in which the shifting controller is configured to perform a shifting control to cause, by controlling the hydraulic pressure in the hydraulic pressure supplier, a shifting ratio of the continuously variable transmission unit to come close to the target shifting ratio; and a detector that is configured to detect an abnormality in which the abnormality influences setting of the target shifting ratio performed by the setting unit. The shifting controller is configured to cause, when the detector detects the abnormality, the hydraulic pressure in the hydraulic pressure supplier to fall within a range that is equal to or greater than a first value and less than a second value, in which the first value is a value at which minimal operation performed by the continuously variable transmission unit is available, and the second value is a value upon normal operation before the detector detects the abnormality.

An aspect of the technology provides a continuously variable transmission that includes: a hydraulic pressure supplier containing a hydraulic fluid; a continuously variable transmission unit configured to be able to perform continuously variable shifting by a hydraulic pressure in the hydraulic pressure supplier; a shifting controller including a setting unit that is configured to set a target shifting ratio of the continuously variable transmission unit on a basis of driving information of a vehicle on which the continuously variable transmission unit is to be mounted, in which the shifting controller is configured to perform a shifting control to cause, by controlling the hydraulic pressure in the hydraulic pressure supplier, a shifting ratio of the continuously variable transmission unit to come close to the target shifting ratio; and a detector configured to detect an abnormality, in which the abnormality influences setting of the target shifting ratio performed by the setting unit. The shifting controller is configured to cause, when the detector detects the abnormality, the hydraulic pressure in the hydraulic pressure supplier to fall within a range that is equal to or greater than a first value and less than a second value, in which the first value is a value at which minimal operation performed by the continuously variable transmission unit is available, and the second value is a value upon normal operation before the detector detects the abnormality.

An aspect of the technology provides a method of controlling a continuously variable transmission that includes a continuously variable transmission unit and a shifting controller, in which the continuously variable transmission unit is configured to be able to perform continuously variable shifting by a hydraulic pressure in a hydraulic pressure supplier, and in which the shifting controller includes a setting unit that is configured to set a target shifting ratio of the continuously variable transmission unit on a basis of driving information of a vehicle on which the continuously variable transmission unit is to be mounted, in which the shifting controller is configured to perform a shifting control to cause, by controlling the hydraulic pressure in the hydraulic pressure supplier, a shifting ratio of the continuously variable transmission unit to come close to the target shifting ratio. The method includes: detecting an abnormality that influences setting of the target shifting ratio performed by the setting unit; and causing, when the abnormality is detected, the hydraulic pressure in the hydraulic pressure supplier to fall within a range that is equal to or greater than a first value and less than a second value, the first value being a value at which minimal operation performed by the continuously variable transmission unit is available, the second value being a value upon normal operation before the abnormality is detected.

DETAILED DESCRIPTION

Figure 1:
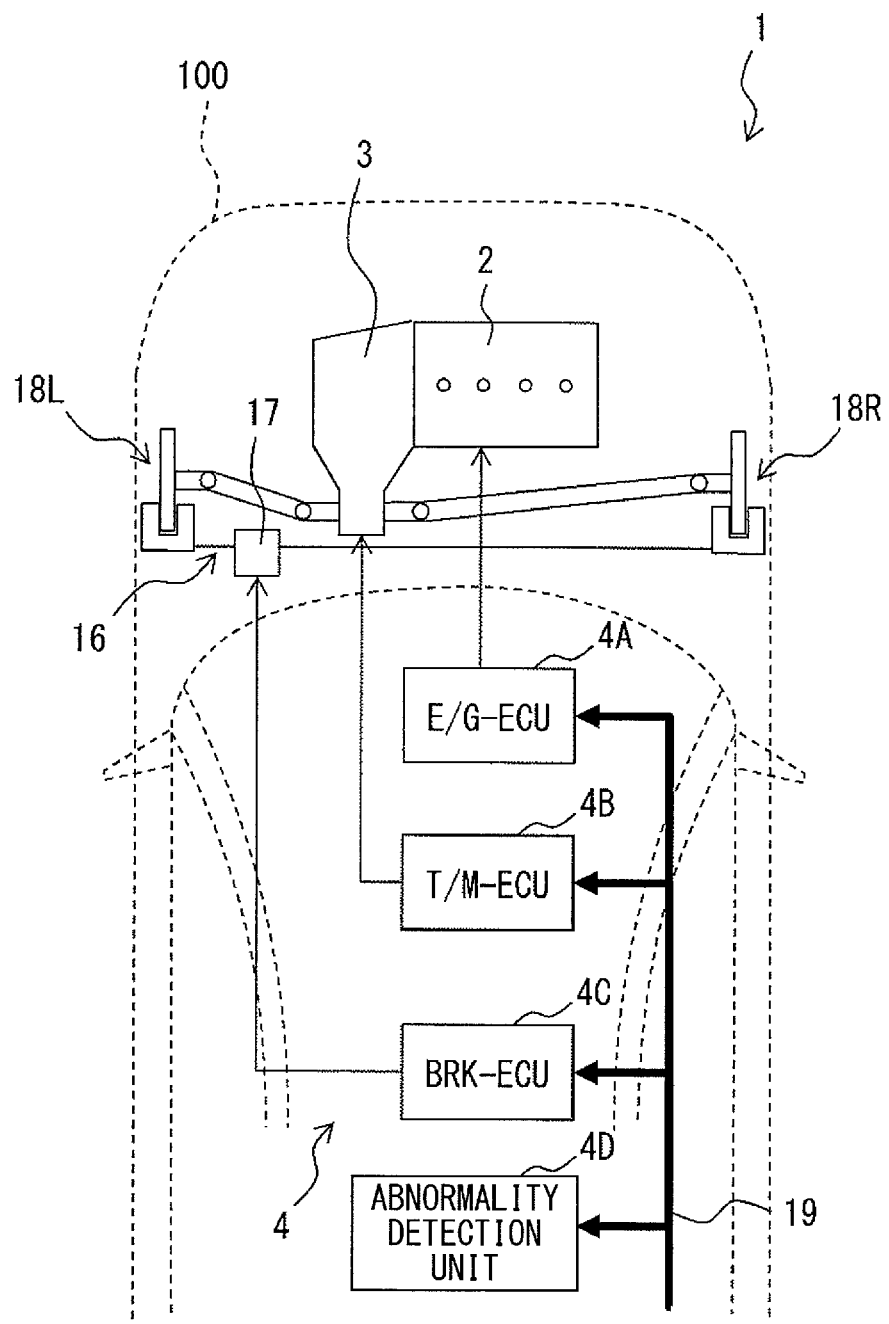
FIG. 1 is a schematic diagram illustrating a general configuration example of a vehicle including a continuously variable transmission and a control apparatus of the continuously variable transmission according to one implementation of the technology.

An error that hinders calculation of a target shifting ratio may possibly occur in a continuously variable transmission. Even in a case of such an error, it is desirable to allow for shifting operation while avoiding sudden deceleration. It is desirable to improve user convenience while securing user safety.

In the following, some implementations of the technology are described in detail with reference to the accompanying drawings. Note that the following description is directed to illustrative examples of the disclosure and not to be construed as limiting to the technology. Factors including, without limitation, numerical values, shapes, materials, components, positions of the components, and how the components are coupled to each other are illustrative only and not to be construed as limiting to the technology. Further, elements in the following example implementations which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description.

Figure 2:
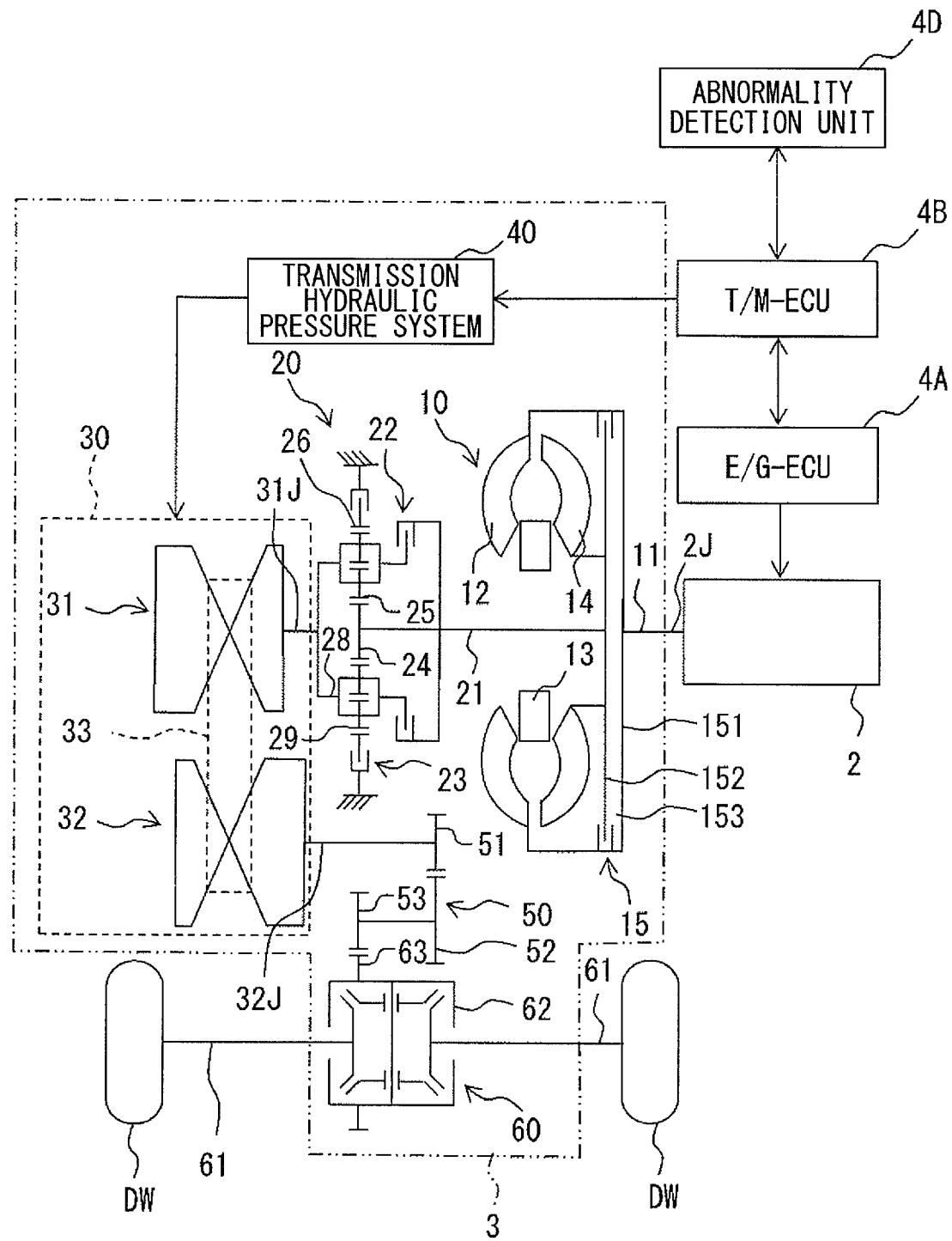
FIG. 2 is a schematic diagram illustrating a detailed configuration example of the continuously variable transmission and the control apparatus of the continuously variable transmission each illustrated in FIG. 1.
Figure 3:
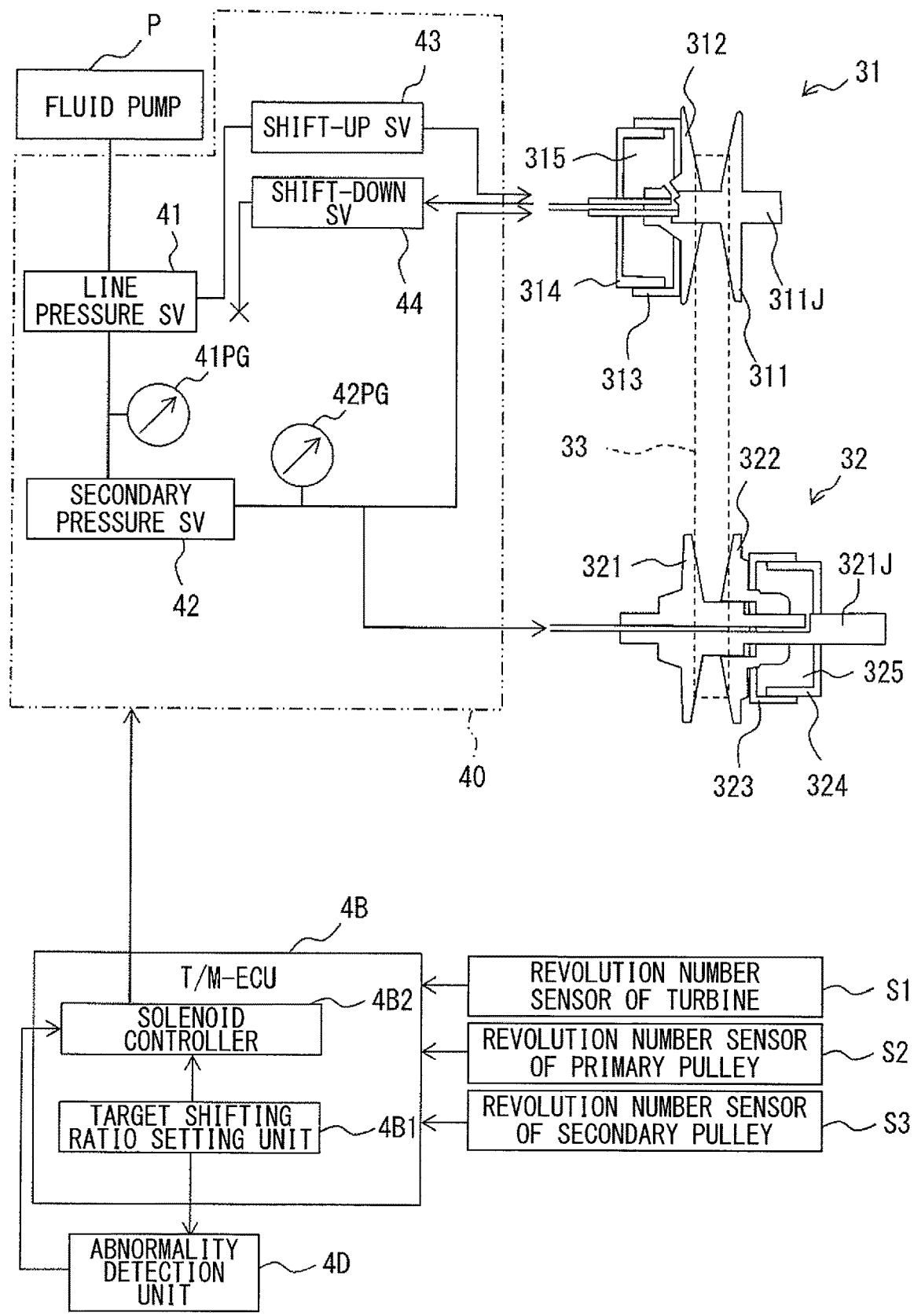
FIG. 3 is a schematic diagram illustrating an example of a continuously variable transmission unit and a transmission hydraulic pressure system each illustrated in FIG. 2.

It is to be noted that the descriptions will be provided in the following example order.
1. Implementation (an example of a control apparatus of a continuously variable transmission configured to reduce a line pressure in a transmission hydraulic pressure system of the continuously variable transmission upon an abnormality detection)
2. Modification Examples <1. Implementation>
[Schematic Configuration of Vehicle 1]
FIG. 1 schematically illustrates a general configuration example of a vehicle 1 incorporating a continuously variable transmission 3 according to an example implementation of the technology. FIG. 2 is a schematic diagram illustrating a detailed configuration example of the continuously variable transmission 3 and a control apparatus 4 of the continuously variable transmission 3 each illustrated in FIG. 1. FIG. 3 is a schematic diagram illustrating a detailed configuration example of a continuously variable transmission unit 30 and a transmission hydraulic pressure system 40 each illustrated in FIG. 2. The control apparatus 4 of the continuously variable transmission 3 according to an example implementation of the technology may control shifting operation of the continuously variable transmission 3. The control apparatus 4 of the continuously variable transmission 3 according to an example implementation of the technology may include a transmission control unit (i.e. T/M-ECU) 4B and an abnormality detection unit 4D. In one implementation, the transmission hydraulic pressure system 40 may serve as a "hydraulic pressure supplier".

The vehicle 1 may be an automobile provided with, for example, four driving wheels DW as described later. Referring to FIG. 1, the vehicle 1 may be provided with a vehicle body 100. In addition to the driving wheels DW, the vehicle 1 may include an engine 2, the continuously variable transmission 3, and the control apparatus 4, in the vehicle body 100. The engine 2 may be a power source. The continuously variable transmission 3 may feed, to the driving wheels DW, drive power derived from the engine 2. The vehicle 1 may further include, in the vehicle body 100, a brake hydraulic system 16, a valve unit 17, and brakes 18L and 18R. In one implementation, the continuously variable transmission 3 may serve as a "continuously variable transmission". In one implementation, the control apparatus 4 may serve as a "control apparatus of a continuously variable transmission".
[Configuration of Engine 2]

The engine 2 may be an internal combustion engine that outputs mechanical energy (e.g. drive power) by combusting fuel such as gasoline. The engine 2 may be, for example, a piston reciprocating engine in which a piston moves backward and forward in a corresponding cylinder. The engine 2 may be provided with components including a fuel injection device, an ignition device, and a throttle valve device. The engine 2 may be controlled by an engine control unit (i.e. E/G-ECU) 4A in the control apparatus 4. The drive power generated by the engine 2 may be outputted from an output shaft 2J illustrated in FIG. 2. The generated drive power may be inputted to the continuously variable transmission 3. The continuously variable transmission 3 may be coupled to the engine 2. In one implementation, the output shaft 2J may serve as a "drive source output member".
[Configuration of Continuously Variable Transmission 3]

Referring to FIG. 2, the continuously variable transmission 3 may include, for example, a torque converter 10, a forward reverse switching mechanism 20, the continuously variable transmission unit 30, the transmission hydraulic pressure system 40, a deceleration unit 50, and a differential 60.
[Torque Converter 10]

The torque converter 10 may be, for example, a fluid feeding device. The fluid feeding device may feed the drive power derived from the engine 2 to the forward reverse switching mechanism 20 by means of a hydraulic fluid. The forward reverse switching mechanism 20 may be located downstream of the torque converter 10. The hydraulic fluid may include, for example, an automatic transmission fluid (i.e. ATF). The fluid feeding device may also increase torque of the drive power. Referring to FIG. 2, the torque converter 10 may include an input shaft 11, three types of impellers including a pump impeller 12, a stator 13, and a turbine runner 14, and a lockup clutch 15.

The pump impeller 12, the stator 13, and the turbine runner 14 may each revolve coaxially around the input shaft 11. The input shaft 11 may be provided at a predetermined location in the torque converter 10. The predetermined location in the torque converter 10 may face the engine 2. The input shaft 11 may be coupled to the output shaft 2J of the engine 2, causing the input shaft 11 and the output shaft 2J to integrally revolve. The pump impeller 12 may be coupled to the input shaft 11, causing the pump impeller 12 and the input shaft 11 to integrally revolve. In contrast, referring to FIG. 2, the turbine runner 14 may be coupled to an input shaft 21 of the forward reverse switching mechanism 20. The input shaft 21 will be described later. Further, the stator 13 may be engageable with a static member out of components configuring the continuously variable transmission 3. The static member may include, for example, a housing of the continuously variable transmission 3. Further, the pump impeller 12 and the turbine runner 14 may be sealed therebetween with the hydraulic fluid.

The torque converter 10 may feed, to the turbine runner 14, the drive power that is derived from the engine 2 and is to be fed to the pump impeller 12. During the feeding, the torque converter 10 may increase the torque of the drive power by means of the hydraulic fluid. The revolution of the pump impeller 12 may cause the hydraulic fluid to move from the pump impeller 12 to the turbine runner 14, following which the hydraulic fluid may return to the pump impeller 12 again. At this occasion, in other words, upon the hydraulic fluid that has moved to the turbine runner 14 returning from the turbine runner 14 to the pump impeller 12, the stator 13 may change a flow direction of the hydraulic fluid to a direction along the revolutions of the pump impeller 12 and the turbine runner 14. This makes it possible, in the torque converter 10, to increase the torque to be fed from the pump impeller 12 to the turbine runner 14.

The lockup clutch 15 may couple the pump impeller 12 and the turbine runner 14 to each other. In an example implementation, the lockup clutch 15 may include a revolution member 151 and a second revolution member 152. The revolution member 151 may be coupled to the input shaft 11. The revolution member 152 may be coupled to the input shaft 21 of the forward reverse switching mechanism 20. The revolution member 151 and the revolution member 152 may be disposed to face each other. When the lockup clutch 15 is in a coupled state, the application of a hydraulic pressure derived from the hydraulic fluid may cause the revolution member 151 and the revolution member 152 to be biased and brought into contact with each other by means of a predetermined clutch pressure, allowing for a synchronous revolution. A hydraulic fluid chamber 153 sealed with the hydraulic fluid may be disposed between the revolution member 151 and the revolution member 152. At this occasion, the pump impeller 12 and the turbine runner 14 may become coupled directly to each other, causing the drive power derived from the engine 2 to be directly fed from the turbine runner 14 to the forward reverse switching mechanism 20. When the lockup clutch 15 is in the coupled state, the E/G-ECU 4A may keep output torque of the output shaft 2J to such a level that a slip occurring on a contact surface between the revolution member 151 and the revolution member 152 is avoided or suppressed, even when an error occurs. The error will be described later. In one implementation, the revolution member 151 may serve as a "first revolution member". In one implementation, the revolution member 152 may serve as a "second revolution member".

The revolution number of the turbine runner 14 (i.e. turbine revolution number) may be detected by a revolution number sensor of turbine S1 illustrated in FIG. 3. The turbine revolution number detected by the revolution number sensor of turbine S1 may be outputted to the transmission control unit (T/M-ECU) 4B. The transmission control unit (T/M-ECU) 4B will be described in detail later.

[Forward Reverse Switching Mechanism 20]

The forward reverse switching mechanism 20 may include a component such as a double pinion planetary gear or a dual planetary gear. The forward reverse switching mechanism 20 may include, for example, the input shaft 21, a sun gear 24, an inner planetary pinion 25, an outer planetary pinion 26, a planetary carrier 28, and a ring gear 29. The input shaft 21 may be coupled to the turbine runner 14 of the torque converter 10. The sun gear 24 may be coupled to the input shaft 21. The sun gear 24 may be in mesh with the inner planetary pinion 25. The outer planetary pinion 26 may be in mesh with the inner planetary pinion 25. The planetary carrier 28 may rotatably support the inner planetary pinion 25 and the outer planetary pinion 26. The ring gear 29 may be in mesh with the outer planetary pinion 26. The planetary carrier 28 may be coupled to an input shaft 31J of the continuously variable transmission unit 30. The input shaft 31J of the continuously variable transmission unit 30 may be referred to as a transmission unit input shaft. The continuously variable transmission unit 30 will be described later.

The forward reverse switching mechanism 20 may further include a forward clutch 22 and a reverse brake 23. The forward clutch 22 may couple the sun gear 24 with the planetary carrier 28. The reverse brake 23 may control the revolution of the ring gear 29. In the forward reverse switching mechanism 20, the forward clutch 22 may be operated into a coupled state, and further, the reverse brake 23 may be operated into a released state. These two operations may cause all of the sun gear 24, the planetary carrier 28, and the ring gear 29 to integrally revolve. This enables the forward reverse switching mechanism 20 to feed, to the transmission unit input shaft 31J, the drive power that is derived from the engine 2 and thereafter received at the input shaft 21. The forward reverse switching mechanism 20 may perform this feeding of the drive power without causing the revolution direction and the revolution speed of the drive power to change. In contrast, the forward clutch 22 may be operated into the released state, and further, the reverse brake 23 may be operated into a stopped state. These two operations may cause the planetary carrier 28 to revolve in the opposite direction to the revolution direction of the sun gear 24. This enables the forward reverse switching mechanism 20 to reverse the revolution direction of the drive power that is derived from the engine 2, to thereby make it possible to feed the drive power to the transmission unit input shaft 31J. The drive power derived from the engine 2 may be received at the input shaft 21. Further, both the forward clutch 22 and the reverse brake 23 may be operated into the released state. This may cause the feeding of the drive power between the sun gear 24 and the planetary carrier 28 to be cut off. In an example implementation, the control apparatus 4 may so cooperate with the forward reverse switching mechanism 20 as to control the states of the forward clutch 22 and the state of the reverse brake 23. The states of the forward clutch 22 may include, for example, the coupled state and the released state. The states of the reverse brake 23 may include, for example, the stopped state and a non-operating state.

[Continuously Variable Transmission Unit 30]

The continuously variable transmission unit 30 may be a CVT that makes it possible to continuously vary a shifting ratio. The continuously variable transmission unit 30 may include the transmission unit input shaft 31J, a primary pulley 31, a transmission unit output shaft 32J, a secondary pulley 32, and a chain 33. The transmission unit input shaft 31J may be coupled to the planetary carrier 28. The transmission unit input shaft 31J may receive the drive power derived from the output shaft 2J via the forward reverse switching mechanism 20. The primary pulley 31 may be provided coaxially with the transmission unit input shaft 31J. The primary pulley 31 may revolve synchronously with the transmission unit input shaft 31J by means of the drive power derived from the engine 2. The transmission unit output shaft 32J may be provided in parallel with the transmission unit input shaft 31J. The transmission unit output shaft 32J may be so provided as to be spaced with a predetermined interval from the transmission unit input shaft 31J. The transmission unit output shaft 32J may output the drive power to the deceleration unit 50. The secondary pulley 32 may be provided coaxially with the transmission unit output shaft 32J. The secondary pulley 32 may revolve synchronously with the transmission unit output shaft 32J. The chain 33 may be a power feeding member that is wound on both the primary pulley 31 and the secondary pulley 32. The chain 33 may feed the drive power derived from the transmission unit input shaft 31J to the transmission unit output shaft 32J. In an example implementation, a metal belt may be used for the power feeding member, in place of the chain 33.

The continuously variable transmission unit 30 may perform its operation when the hydraulic pressure is supplied from the transmission hydraulic pressure system 40 to the continuously variable transmission unit 30. The continuously variable transmission unit 30 may vary a pulley width of the primary pulley 31, to thereby make it possible to vary a winding diameter of the chain 33 that is wound on the primary pulley 31. Further, the continuously variable transmission unit 30 may vary a pulley width of the secondary pulley 32, to thereby make it possible to vary the winding diameter of the chain 33 that is wound on the secondary pulley 32. Under the control performed by the T/M-ECU4B, the continuously variable transmission unit 30 may vary the pulley width of the primary pulley 31, to thereby cause the winding diameter of the chain 33 on the primary pulley 31 to change, and similarly, may vary the pulley width of the secondary pulley 32, to thereby cause the winding diameter of the chain 33 on the secondary pulley 32 to change. The ratio of a winding diameter Ro of the chain 33 on the secondary pulley 32 to a winding diameter Ri of the chain 33 on the primary pulley 31 (Ro/Ri) may be a shifting ratio that is a ratio of the revolution speed Ni of the transmission unit input shaft 31J to the revolution speed No of the transmission unit output shaft 32J (Ni/No). The continuously variable transmission unit 30 may continuously vary at least one of the pulley width of the primary pulley 31 and the pulley width of the secondary pulley 32, to thereby make it possible to continuously vary the shifting ratio (Ni/No).

The continuously variable transmission unit 30 may vary the revolution speed of the drive power (i.e. torque) received at the transmission unit input shaft 31J. This variation of the torque may be controlled by means of the configuration between the primary pulley 31 and the secondary pulley 32. The resultant drive power may be fed from the transmission unit output shaft 32J to the deceleration unit 50. The number of revolutions of the primary pulley 31 (i.e. the primary pulley revolution number) may be detected by a revolution number sensor of primary pulley S2, as illustrated in FIG. 3. The number of revolutions of the secondary pulley 32 (i.e. the secondary pulley revolution number) may be detected by a revolution number sensor of secondary pulley S3, as illustrated in FIG. 3. Both the number of revolutions of the primary pulley and the number of revolutions of the secondary pulley each detected by the corresponding sensor may be outputted to the transmission control unit (T/M-ECU) 4B.

Referring to FIG. 3, a detailed description will be given here of the configuration of the primary pulley 31 and the configuration of the secondary pulley 32 in the continuously variable transmission unit 30.

As illustrated in FIG. 3, the primary pulley 31 may include a fixed sheave 311 and a movable sheave 312. The fixed sheave 311 may be integrally formed with a primary shaft 311J that is fixed to the transmission unit input shaft 31J. The movable sheave 312 may be so provided as to be movable toward the fixed sheave 311 along a direction in which the primary shaft 311J extends. The primary pulley 31 may include a plunger 314 that is coupled to the primary shaft 311J of the fixed sheave 311. The primary pulley 31 may also include a cylinder 313 that is coupled to the movable sheave 312. The cylinder 313 may be in slidable contact with an outer peripheral surface of the plunger 314. The primary pulley 31 may also include a hydraulic fluid chamber 315 that is disposed between the plunger 314 and the cylinder 313. The hydraulic fluid chamber 315 may be used for driving the movable sheave 312 in the axial direction of the primary shaft 311J by means of the hydraulic pressure.

In a similar manner to the primary pulley 31, the secondary pulley 32 may include a fixed sheave 321 and a movable sheave 322. The fixed sheave 321 may be integrally formed with a secondary shaft 321J that is fixed to the transmission unit output shaft 32J. The movable sheave 322 may be so provided as to be movable toward the fixed sheave 321 along a direction in which the secondary shaft 321J extends. The secondary pulley 32 may include a plunger 324 that is coupled to the secondary shaft 321J of the fixed sheave 321. The secondary pulley 32 may also include a cylinder 323 that is coupled to the movable sheave 322. The cylinder 323 may be in slidable contact with an outer peripheral surface of the plunger 324. The secondary pulley 32 may also include a hydraulic fluid chamber 325 that is disposed between the plunger 324 and the cylinder 323. The hydraulic fluid chamber 325 may be used for driving the movable sheave 322 in the axial direction of the secondary shaft 321J by means of the hydraulic pressure.

The hydraulic fluid chamber 315 of the primary pulley 31 and the hydraulic fluid chamber 325 of the secondary pulley 32 may be each supplied with the hydraulic pressure derived from the transmission hydraulic pressure system 40. The primary pulley 31 may have a groove width that is determined by the hydraulic pressure to be supplied to the hydraulic fluid chamber 315 (hereinafter, referred to as a primary pressure). The secondary pulley 32 may have a groove width that is determined by the hydraulic pressure to be supplied to the hydraulic fluid chamber 325 (hereinafter, referred to as a secondary pressure). The transmission hydraulic pressure system 40 may adjust both the primary pressure supplied to the hydraulic fluid chamber 315 and the secondary pressure supplied to the hydraulic fluid chamber 325. In other words, the primary pressure may be a hydraulic pressure that is supplied to the primary pulley 31 as a hydraulic device in the continuously variable transmission unit 30. Similarly, the secondary pressure may be a hydraulic pressure that is supplied to the secondary pulley 32 as the hydraulic device in the continuously variable transmission unit 30. The hydraulic pressures (e.g. the primary pressure, the secondary pressure, and another pressure) may be each adjusted by the transmission hydraulic pressure system 40 and each supplied to the corresponding hydraulic device. Such hydraulic pressures may be controlled by the control apparatus 4 in accordance with a driving state (e.g. a shifting ratio) of the vehicle 1. Note that, when a line pressure in the transmission hydraulic pressure system 40 adjusted by a line pressure SV 41 is equal to or greater than a first value, the primary pressure may be acquired. The primary pressure may be a first clamp pressure that is able to prevent or suppress a slip occurring between the primary pulley 31 and the chain 33. Similarly, note that, when the line pressure in the transmission hydraulic pressure system 40 adjusted by the line pressure SV 41 is equal to or greater than the first value, the secondary pressure may be acquired. The secondary pressure may be a second clamp pressure that is able to prevent or suppress a slip occurring between the secondary pulley 32 and the chain 33. In one implementation, the line pressure may serve as a "hydraulic pressure in a hydraulic pressure supplier".

[Transmission Hydraulic Pressure System 40]

Referring to FIG. 3, the transmission hydraulic pressure system 40 may include a line pressure solenoid valve (i.e. SV) 41, a secondary pressure SV 42, a shift-up SV 43, and a shift-down SV 44. The line pressure SV 41 may adjust a line pressure. The line pressure may be an original pressure of a hydraulic fluid to be supplied from a fluid pump P. The line pressure SV 41 may be coupled to each of the secondary pressure SV 42, the shift-up SV 43, and the shift-down SV 44. Through the control performed by the solenoid valve controller 4B2, the line pressure SV 41, the secondary pressure SV 42, the shift-up SV 43, and the shift-down SV 44 may be each caused to perform opening-closing operation, to thereby cause the transmission hydraulic pressure system 40 to adjust a hydraulic fluid pressure for performing the shifting operation in the continuously variable transmission unit 30. The solenoid valve controller 4B2 illustrated in FIG. 3 will be described later.

The secondary pressure SV 42 may be coupled to both the hydraulic fluid chamber 315 of the primary pulley 31 and the hydraulic fluid chamber 325 of the secondary pulley 32 by means of piping. Therefore, the hydraulic fluid may pass through the secondary pressure SV 42, and thereafter may be supplied to both the hydraulic fluid chamber 315 of the primary pulley 31 and the hydraulic fluid chamber 325 of the secondary pulley 32. The hydraulic pressure supplied to the hydraulic fluid chamber 325 (i.e. the secondary pressure) may be adjusted by the secondary pressure SV 42. The transmission hydraulic pressure system 40 may include a pressure gauge 41PG provided at a pipe connecting the line pressure SV 41 and the secondary pressure SV 42, to thereby measure the line pressure. The transmission hydraulic pressure system 40 may also include a pressure gauge 42PG provided at a pipe running from the secondary pressure SV 42 to the secondary pulley 32, to thereby measure the secondary pressure. The measured value of the line pressure at the pressure gauge 41PG and the measured value of the secondary pressure at the pressure gauge 42PG may be each outputted to the transmission control unit (T/M-ECU) 4B.

The shift-up SV 43 and the shift-down SV 44 may be each coupled to the hydraulic fluid chamber 315 of the primary pulley 31 by means of piping. Therefore, when the shift-up SV 43 is opened in a state of the shift-down SV 44 being closed, the hydraulic fluid is supplied to the hydraulic pressure chamber 315. In such a case, the primary pressure increases, a result of which the movable sheave 312 moves close to the fixed sheave 311. This makes the groove width of the primary pulley 31 narrower. In contrast, when the shift-down SV 44 is opened in a state of the shift-up SV 43 being closed, the primary pressure decreases, a result of which the hydraulic fluid is discharged from the hydraulic fluid chamber 315. In such a case, the movable sheave 312 moves away from the fixed sheave 311. This makes the groove width of the primary pulley 31 wider.

[Deceleration Unit 50]

The deceleration unit 50 may include a drive gear 51, a driven gear 52, and a differential drive gear 53. The drive gear 51 may be coupled to the transmission unit output shaft 32J. The driven gear 52 may be in mesh with the drive gear 51. The differential drive gear 53 may be coupled to the driven gear 52. The differential drive gear 53 may be in mesh with a ring gear 63. The ring gear 63 may be fixed to a differential case 62 of the differential 60. The differential case 62 will be described later. The deceleration unit 50 may perform deceleration of the vehicle 1 to thereby increase torque of the drive power derived from the transmission unit output shaft 32J. Thereafter, the deceleration unit 50 may feed the resultant drive power to the differential 60.

[Differential 60]

The differential 60 may distribute and feed the resultant drive power derived from the deceleration unit 50 to each of left and right drive shafts 61. Each of the left and right drive shafts 61 may be coupled to a corresponding drive wheel DW. The drive power outputted from the output shaft 2J of the engine 2 may be fed to the drive wheels DW via the continuously variable transmission 3. The drive power fed to the drive wheels DW causes friction force between the drive wheels DW and a road surface on which the vehicle 1 is traveling, a result of which driving force to cause the vehicle 1 to travel is generated.

[Configuration of Control Apparatus 4]

As illustrated in FIG. 1, the control apparatus 4 may include the engine control unit (E/G-ECU) 4A, the transmission control unit (T/M-ECU) 4B, a brake control unit (BRK-ECU) 4C, and an abnormality detection unit 4D. The E/G-ECU 4A, the T/M-ECU 4B, the BRK-ECU 4C, and the abnormality detection unit 4D may be so coupled to one another as to perform communication mutually via a communication bus 19. Non-limiting examples of a communication network may include a controller area network (CAN) which is one of the standard protocols from the International Organization for Standardization (ISO). These units may configure a control system of the vehicle 1. Note that the coupling of the E/G-ECU 4A, the T/M-ECU 4B, the BRK-ECU 4C, and the abnormality detection unit 4D is not limited to the configuration of the coupling with use of the communication bus 19. The coupling may be configured with use of, for example, wireless LAN. In one implementation, the E/G-ECU 4A may serve as a "drive source controller". In one implementation, the T/M-ECU 4B may serve as a "shifting controller". In one implementation, the abnormality detection unit 4D may serve as a "detector".

The E/G-ECU 4A, the T/M-ECU 4B, and the BRK-ECU 4C may each include components including a microcontroller (e.g. a microprocessor), read-only memory (ROM), random access memory (RAM), backup RAM, and an input-output I/F. The microcontroller may perform various arithmetic calculations. The ROM may store data such as programs that cause the microcontroller to execute various types of processing. The RAM may store various types of data such as arithmetic calculation results. The backup RAM may retain the stored data by means of, for example, a 12V battery.

In the control apparatus 4, various types of information may be shared via the communication bus 19. The various types of information may include, for example, detection signals that are inputted from various types of switches and various types of sensors to the E/G-ECU 4A, the T/M-ECU 4B, and the BRK-ECU 4C. The E/G-ECU 4A, for example, may output a control signal to components of the engine 2, to thereby control a factor such as engine output torque. The components of the engine 2 may include, for example, a throttle mechanism, a fuel injection mechanism, and an ignition mechanism. This causes the E/G-ECU 4A to perform output control of the engine 2. Note that a so-called revolution limit (i.e. rev. limit) may be normally preset in the engine 2. The rev. limit refers to an upper limit value of a permitted revolution speed of the output shaft 2J. When the revolution speed of the output shaft 2J in the engine 2 reaches a predetermined rev. limit, the E/G-ECU 4A may stop fuel from being supplied to a combustion chamber of the engine 2. The E/G-ECU 4A may obtain the revolution speed of the output shaft 2J as a control variable of the engine 2 by means of an engine revolution number sensor, for example.

The T/M-ECU 4B may output a control signal to the continuously variable transmission 3, to thereby adjust the hydraulic fluid pressure in the transmission hydraulic pressure system 40 in the continuously variable transmission 3. Through the adjustment of this hydraulic fluid pressure, the T/M-ECU 4B may perform a shifting control. The transmission hydraulic pressure system 40 may be illustrated, for example, in FIGS. 2 and 3. Further, the T/M-ECU 4B may request the E/G-ECU 4A to reduce engine output torque (i.e. torque down). Moreover, various types of information from various types of sensors may be inputted to the T/M-ECU 4B. The various types of sensors may include, for example, the revolution number sensor of turbine S1, the revolution number sensor of primary pulley S2, and the revolution number sensor of secondary pulley S3. The T/M-ECU 4B may further include a target shifting ratio setting unit 4B1 and a solenoid valve controller 4B2. The microcontroller may include both the target shifting ratio setting unit 4B1 and the solenoid valve controller 4B2. The target shifting ratio setting unit 4B1 may set a target shifting ratio of the continuously variable transmission unit 30. The target shifting ratio may be set on the basis of driving information of the vehicle 1. The driving information of the vehicle 1 may include, for example, a position of an accelerator pedal and the secondary pulley revolution number. The position of the accelerator pedal may be to be sent from the E/G-ECU 4A. The secondary pulley revolution number may be to be sent from the revolution number sensor of secondary pulley S3. The T/M-ECU 4B may so perform the shifting control as to cause an actual shifting ratio of the continuously variable transmission unit 30 to come close to a target shifting ratio. The target shifting ratio may be set at the target shifting ratio setting unit 4B1. In an example implementation, the T/M-ECU 4B may adjust pressures on the basis of the control of the solenoid valve controller 4B2, to thereby cause the actual shifting ratio of the continuously variable transmission unit 30 to come close to the target shifting ratio. The target shifting ratio may be set at the target shifting ratio setting unit 4B1. The pressures may include, for example, the line pressure, the primary pressure, and the secondary pressure, in the transmission hydraulic pressure system 40. In one implementation, the target shifting ratio setting unit 4B1 may serve as a "setting unit".

When the abnormality detection unit 4D has detected a factor such as an error of any of various types of sensors or an abnormality in a target shifting ratio, the T/M-ECU 4B may so control the transmission hydraulic pressure system 40 that the line pressure in the transmission hydraulic pressure system 40 becomes lower than the line pressure upon normal operation. In an example implementation, the solenoid valve controller 4B2 may cause the line pressure to fall within a range that is equal to or greater than a first value and less than a second value. The first value may be a limit required for the protection of the continuously variable transmission unit 30. The second value may be a value upon normal operation. The line pressure equivalent to the limit required for the protection of the continuously variable transmission unit 30 may be a line pressure in which minimum operation performed by each of the hydraulic devices in the continuously variable transmission unit 30 is available. The minimum operation may also be basic operation performed by each of the hydraulic devices. The minimum operation may be, for example, operation for the protection of the continuously variable transmission unit 30. The protection of the continuously variable transmission unit 30 as used herein may refer to avoiding deterioration in the performance of the continuously variable transmission unit 30. For example, operation in which the chain 33 revolves with both the primary pulley 31 and the secondary pulley 32 without any slip occurring therebetween may correspond to the avoidance of deterioration in the performance of the continuously variable transmission unit 30. The first value may be a pressure value of the minimum line pressure that is required for the maintenance of the performance of the continuously variable transmission unit 30. The first value may also be, for example, a protection pressure for the continuously variable transmission unit 30. In addition, the wording "upon normal operation" refer to timing prior to an error detection or an abnormality detection performed by the abnormality detection unit 4D.

The T/M-ECU 4B may lower the line pressure in the transmission hydraulic pressure system 40 by lowering a required hydraulic pressure of each of a plurality of hydraulic devices of the continuously variable transmission unit 30. The plurality of hydraulic devices of the continuously variable transmission unit 30 may include the primary pulley 31 and the secondary pulley 32, in an example implementation. Both the primary pulley 31 and the secondary pulley 32 may relate to a shifting speed in the continuously variable transmission unit 30.

The T/M-ECU 4B may further so keep the line pressure in the transmission hydraulic pressure system 40 as to be equal to or greater than a clutch pressure at which the forward clutch 22 serves as a torque fuse. In other words, the solenoid valve controller 4B2 may so control the clutch pressure and so keep the line pressure that feeding torque of the forward clutch 22 becomes lower than torque at which a slip occurs inside the continuously variable transmission unit 30. The clutch pressure may act on the forward clutch 22.

The BRK-ECU 4C may further output a control signal to the valve unit 17, to thereby adjust a brake hydraulic pressure. The valve unit 17 may be provided at the brake hydraulic system 16. Through the adjustment of the brake hydraulic pressure, the BRK-ECU 4C may so control braking force of each of the brakes 18L and 18R as to avoid, for example, wheel lock-up upon braking, and tire slip upon accelerating or turning.

The abnormality detection unit 4D may detect an abnormality that influences setting of a target shifting ratio. The setting of the target shifting ratio may be performed by the target shifting ratio setting unit 4B1. Non-limiting examples of the abnormality that influences the setting of the target shifting ratio may include an error of the revolution number sensor of turbine S1, the revolution number sensor of primary pulley S2, or the revolution number sensor of secondary pulley S3, and an error of the microcontroller of the T/M-ECU 4B. The error of the microcontroller of the T/M-ECU 4B may be determined by the abnormality detection unit 4D. The determination may be made on the basis of whether the abnormality in the target shifting ratio is present, i.e. whether reasonableness of the target shifting ratio is present, in an example implementation. The target shifting ratio may be set by the target shifting ratio setting unit 4B1. For the determination of the reasonableness of the target shifting ratio, validity of the target shifting ratio may be examined. For example, the validity of the target shifting ratio may be examined by calculating an estimated value of an acceleration rate of the vehicle 1, and thereafter, comparing the estimated value of the acceleration rate of the vehicle 1 with a reference value. The estimated vehicle of the acceleration rate of the vehicle 1 may be, for example, an estimated vehicle acceleration rate of the vehicle 1. The estimated vehicle acceleration rate of the vehicle 1 may be calculated on the basis of factors including input torque to be inputted to the continuously variable transmission 3, drive power generated at the continuously variable transmission 3, travel resistance of the vehicle 1, and weight of the vehicle 1.

[Operation performed by Continuously Variable Transmission 3 and Control Apparatus 4]

Figure 4:
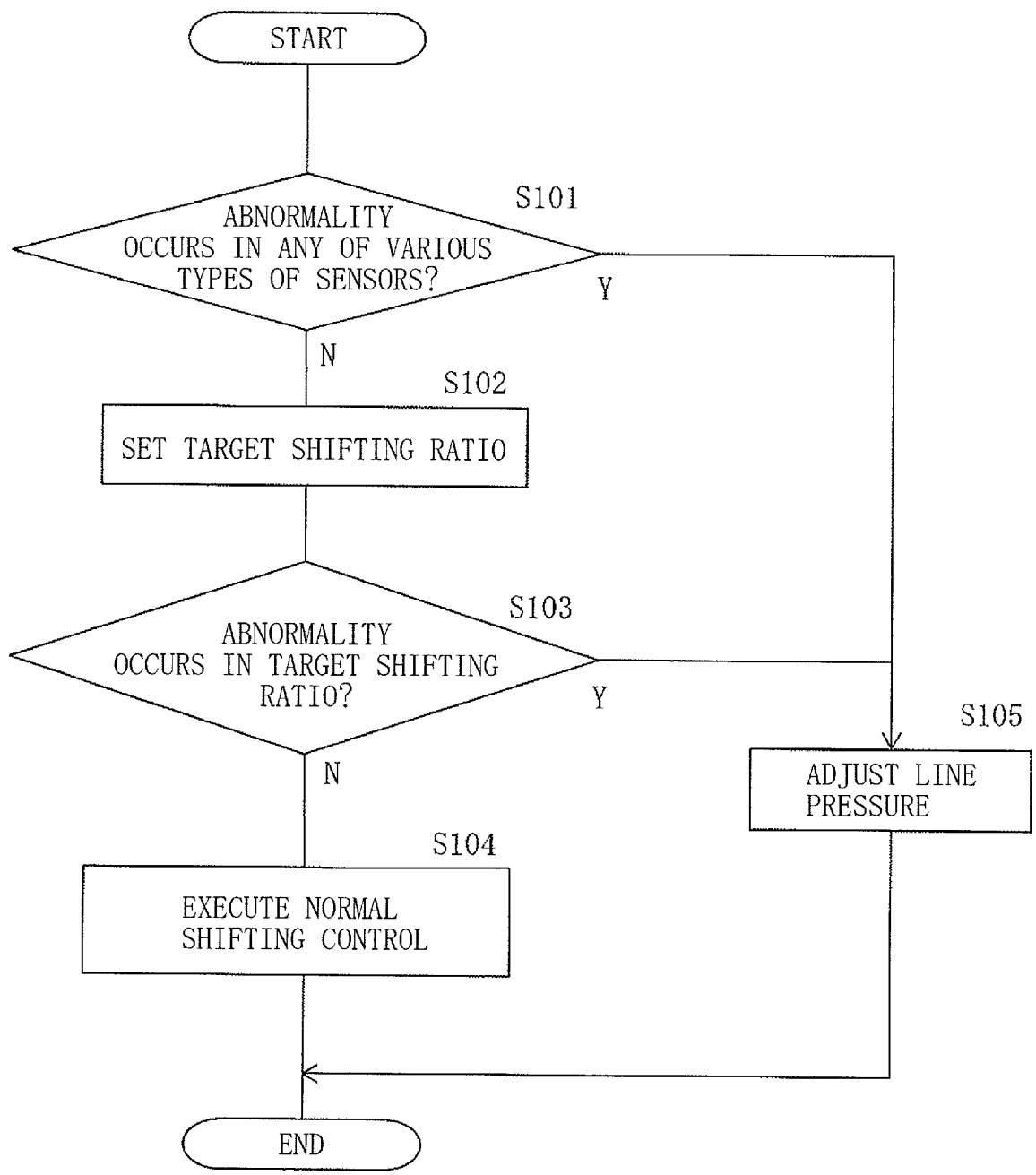
FIG. 4 is a flowchart illustrating an example of operation relating to an abnormality detection in the continuously variable transmission and the control apparatus illustrated in FIG. 1.

Next, referring to FIG. 4, a description is given of operation in the continuously variable transmission 3 and the control apparatus 4. In particular, a description is given of operation relating to an abnormality detection. FIG. 4 is a flowchart illustrating an example of operation relating to an abnormality detection in the continuously variable transmission 3 and the control apparatus 4. A sequence of the operation illustrated in FIG. 4 may be repetitively performed for each predetermined time in the continuously variable transmission 3 and the control apparatus 4.

First, in step S101, a determination may be made as to whether an abnormality occurs in a device such as a sensor that influences the setting of the target shifting ratio. In an example implementation, in step S101, the abnormality detection unit 4D may determine whether the abnormality occurs in any of various types of sensors on the basis of various types of information inputted to the T/M-ECU 4B. Non-limiting examples of the various types of information may include the turbine revolution number derived from the revolution number sensor of turbine S1, the primary pulley revolution number derived from the revolution number sensor of primary pulley S2, and the secondary pully revolution number derived from the revolution number sensor of secondary pulley S3.

When any abnormality is not detected in step S101 (N in step S101), the target shifting ratio setting unit 4B1 may set the target shifting ratio of the continuously variable transmission unit 30 in step S102. At this occasion, the target shifting ratio setting unit 4B1 may set the target shifting ratio on the basis of driving information of the vehicle 1. The driving information may include, for example, the position of the accelerator pedal and the secondary pulley revolution number. The position of the accelerator pedal may be to be sent from the E/G-ECU 4A. The secondary pulley revolution number may be to be sent from the revolution number sensor of secondary pulley S3.

After the setting of the target shifting ratio in step S102, a determination may be made as to whether an abnormality occurs in the target shifting ratio in step S103. In step S103, the abnormality detection unit 4D may determine the reasonableness of the target shifting ratio that is set by the target shifting ratio setting unit 4B1. For example, the abnormality detection unit 4D may calculate an estimated vehicle acceleration rate of the vehicle 1, and thereafter, may compare the estimated vehicle acceleration rate with a reference value. The estimated vehicle acceleration rate may be calculated on the basis of factors including input torque to be inputted to the continuously variable transmission 3, drive power generated at the continuously variable transmission 3, running resistance of the vehicle 1, and weight of the vehicle 1. As a result, in step S103, the abnormality detection unit 4D may determine that, when a calculated value of the estimated vehicle acceleration rate is greater than the reference value, the target shifting ratio is reasonable, and thus, normal (N in step S103). In contrast, in step S103, the abnormality detection unit 4D may determine that, when the calculated value of the estimated vehicle acceleration rate is equal to or less than the reference value, the target shifting ratio is unreasonable, and thus, abnormal (Y in step S103).

When any abnormality is not detected in step S103 (N in step S103), the transmission hydraulic pressure system 40 may execute, in step S104, normal shifting control of the continuously variable transmission unit 30 on the basis of the control of the solenoid valve controller 4B2. Thereafter, the sequence of the operation may end.

In contrast, when an abnormality is detected in step S101 (Y in step S101), or when an abnormality is detected in step S103 (Y in step S103), the line pressure in the transmission hydraulic pressure system 40 may be adjusted, in step S105, on the basis of the control of the solenoid valve controller 4B2. In an example implementation, the solenoid valve controller 4B2 may cause the line pressure to fall within a range that is equal to or greater than the first value and less than the second value. The first value may be a limit required for the protection of the continuously variable transmission unit 30. The second value may be a value upon the normal operation. At this occasion, the solenoid valve controller 4B2 may so keep the line pressure as to be equal to or greater than the clutch pressure at which the forward clutch 22 serves as a torque fuse. Further, the T/M-ECU 4B may request the E/G-ECU 4A to reduce output torque. Thereafter, the sequence of the operation may end.

[Workings and Effects]

In an example implementation as described above, when the abnormality detection unit 4D detects an abnormality, the control apparatus 4 causes the line pressure to be reduced to the first value at which the minimum operation performed by the continuously variable transmission unit 30 is available. Therefore, the hydraulic pressure usable for the shifting control is restrictive. This makes it possible to avoid sudden shifting, and thereby to moderate the deceleration speed upon an abnormality detection, leading to the safety improvement. Moreover, the control of the control apparatus 4 upon the abnormality detection does not prevent the shifting operation itself. Therefore, even upon the abnormality detection, although the speed of the shifting operation upon the abnormality detection may possibly be more moderate than the speed of the shifting operation upon the normal shifting control, it is still possible to perform the shifting operation in accordance with a driving situation of the vehicle 1. This ensures user convenience.

One method for ensuring fail-safe control may be to prevent, upon the abnormality detection, the shifting operation based on the target shifting ratio by setting the drive duty of each of the shift-up SV 43 and the shift-down SV 44 to 0%, to thereby close the shift-up SV 43 and the shift-down SV 44. This makes it possible to prevent the sudden deceleration of the vehicle 1. However, this may possibly lead to a situation in which any shifting operation is unavailable. Hence, this may also possibly hinder traveling of the vehicle 1, which may possibly impair the user convenience. In contrast, according to an example implementation of the technology, it is still possible to perform the shifting operation even after the abnormality detection. The speed of the shifting operation upon the abnormality detection may possibly be more moderate than the speed of the shifting operation upon the normal shifting control; however, there remains a possibility of achieving the target shifting ratio. As a result, according to an example implementation of the technology, user convenience is further improved, as compared to the case in which the shifting operation based on the target shifting ratio is prevented.

Further, the control apparatus 4 keeps the line pressure to be equal to or greater than the first value. The first value may be the limit required for the protection of the continuously variable transmission unit 30. Therefore, the performance protection of the continuously variable transmission unit 30 is achieved. For example, the chain 33 is able to revolve with both the primary pulley 31 and the secondary pulley 32 without any slip occurring therebetween. Accordingly, damage to the continuously variable transmission unit 30 is avoided. Hence, there remains a possibility of reusing the continuously variable transmission unit 30.

The T/M-ECU 4B in the control apparatus 4 according to an example implementation as described above may further so keep the line pressure in the transmission hydraulic pressure system 40 as to be equal to or greater than a clutch pressure at which the forward clutch 22 serves as a torque fuse. Therefore, even when excessive torque is inputted from the torque converter 10 to the transmission unit input shaft 31J, a slip occurs at the forward clutch 22 before a slip may possibly occur inside the continuously variable transmission unit 30. As a result, it is possible to achieve the performance protection of the continuously variable transmission unit 30.

Further, the T/M-ECU 4B may request the E/G-ECU 4A to reduce output torque. Therefore, it is possible to prevent or suppress slips. The slips may include, for example, a slip occurring on a contact surface between the revolution member 151 and the revolution member 152 of the lockup clutch 15, a slip occurring at the forward clutch 22, and a slip occurring inside the continuously variable transmission unit 30. Therefore, it is possible to achieve the performance protection of the torque converter 10 or the performance protection of the continuously variable transmission unit 30.

<2. Modified Examples>

Although the technology is described hereinabove with reference to the example implementations, the technology is not limited to the example implementations, and may be modified in wide variety of ways.

For example, any of the example implementations of the technology may be applied to a chain-type continuously variable transmission with use of the chain 33 or a belt-type continuously variable transmission with use of a belt. However, the technology is not limited these example implementations. For example, any of the example implementations of the technology may be applied to a toroidal-type continuously variable transmission or another type of continuously variable transmission.

Further, the E/G-ECU 4A and the T/M-ECU 4B in any of the example implementations of the technology may be each configured by discrete hardware, or may be configured by integrated hardware.

Further, in the transmission hydraulic pressure system 40 in any of the example implementations as describe above, some solenoid valves may be used. However, for a hydraulic pressure supplier of an example implementation of the technology, a device such as a stepping motor may be used in place of the solenoid valve. Further, a hydraulic fluid path system of the hydraulic pressure supplier according to an example implementation of the technology is not limited to the hydraulic fluid path system of the transmission hydraulic pressure system 40 illustrated in FIG. 3 according to an example implementation of the technology. Another hydraulic fluid path system may be used. For example, in the transmission hydraulic pressure system 40 in an example implementation, the hydraulic fluid may pass through the secondary pressure SV 42, and thereafter, may be supplied to both the hydraulic fluid chamber 315 of the primary pulley 31 and the hydraulic fluid chamber 325 of the secondary pulley 32. However, in the hydraulic pressure supplier of an example implementation of the technology, the hydraulic fluid may pass through the secondary pressure SV 42, and thereafter, may not be supplied to the hydraulic fluid chamber 315 of the primary pulley 31, but may only be supplied to the hydraulic fluid chamber 325 of the secondary pulley 32.

Further, the primary pulley 31 and the secondary pulley 32 are exemplified as the hydraulic devices of the continuously variable transmission unit 30 in an example implementation as described above. However, the hydraulic devices according to an example implementation of the technology is not limited thereto. The hydraulic devices may include, for example, a power roller, and an input and output discs in a traction drive transmission unit such as a toroidal continuously variable transmission.

Further, in an example implementation as describe above, examples of the abnormality that influences the setting of the target shifting ratio may include the error of the revolution number sensor of turbine S1, the revolution number sensor of primary pulley S2, or the revolution number sensor of secondary pulley S3, and the error of the microcontroller of the T/M-ECU 4B. However, the abnormality that influences the setting of the target shifting ratio according to an example implementation of the technology is not limited thereto. For example, the abnormality may include various factors. Such factors may include, for example, an error of an accelerator pedal sensor detecting a position of an accelerator pedal and an error of a vehicle speed sensor detecting a traveling speed of a vehicle.

Further, the sequence of the operation in an example implementation as described above may be performed by hardware (e.g. a circuit) or software (e.g. a program). In a case where the sequence of the operation is performed by software, the software may include a group of programs that causes a computer to execute each pieces of processing. Each of the programs may be incorporated into the computer in advance, or may be installed in the computer via a network or a storage medium.

Note that the effects described in an example implementation of the technology are merely exemplary effects, and thus not limited thereto. There may be another effects.

In the control apparatus of the continuously variable transmission, the continuously variable transmission, and the method of controlling the continuously variable transmission according to an example implementation of the technology, the hydraulic pressure of the hydraulic pressure supplier is restricted. Therefore, it is possible to allow for moderate shifting operation while avoiding sudden deceleration.

The T/M-ECU 4B illustrated in FIGS. 1, 2, and 3 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the T/M-ECU 4B. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the T/M-ECU 4B illustrated in FIGS. 1, 2, and 3.

Although some implementations of the technology have been described in the foregoing by way of example with reference to the accompanying drawings, the technology is by no means limited to the implementations described above. The use of the terms first, second, etc. does not denote any order or importance, but rather the terms first, second, etc. are used to distinguish one element from another. It should be appreciated that modifications and alterations may be made by persons skilled in the art without departing from the scope as defined by the appended claims. The technology is intended to include such modifications and alterations in so far as they fall within the scope of the appended claims or the equivalents thereof.

The invention claimed is:

1. A control apparatus of a continuously variable transmission, the continuously variable transmission including a hydraulic pressure supplier, a continuously variable transmission unit and a plurality of revolution number sensors, the hydraulic pressure supplier containing a hydraulic fluid, the continuously variable transmission unit being able to perform continuously variable shifting by a hydraulic pressure in the hydraulic pressure supplier, the control apparatus being configured to control the continuously variable transmission, the control apparatus comprising:
    a shifting controller including a setting unit configured to set a target shifting ratio of the continuously variable transmission unit on a basis of driving information of a vehicle on which the continuously variable transmission unit is to be mounted, the shifting controller including a microcontroller, the shifting controller being configured to perform a shifting control to cause, by controlling the hydraulic pressure in the hydraulic pressure supplier, a shifting ratio of the continuously variable transmission unit to come close to the target shifting ratio; and
    a detector configured to detect an abnormality, the abnormality influencing setting of the target shifting ratio performed by the setting unit, wherein the detector determines presence of the abnormality when the detector detects at least one of an abnormality of the microcontroller and an error of any of the revolution number sensors,
    the shifting controller being configured to cause, when the detector detects the abnormality, the hydraulic pressure in the hydraulic pressure supplier to fall within a range that is equal to or greater than a first value and less than a second value, the first value being a value at which minimal operation performed by the continuously variable transmission unit is available, the second value being a value upon normal operation before the detector detects the abnormality.

2. The control apparatus of the continuously variable transmission according to claim 1, wherein
    the continuously variable transmission unit includes a plurality of hydraulic devices, and
    the shifting controller lowers the hydraulic pressure in the hydraulic pressure supplier by lowering a required hydraulic pressure of each of the plurality of hydraulic devices.

3. The control apparatus of the continuously variable transmission according to claim 2, wherein the shifting controller lowers the required hydraulic pressure of one or more hydraulic devices out of the plurality of hydraulic devices, the one or more hydraulic devices relating to a shifting speed of the continuously variable transmission unit.

4. The control apparatus of the continuously variable transmission according to claim 1, wherein
    the detector detects an abnormality of the microcontroller by determining reasonableness of the target shifting ratio, the abnormality of the microcontroller being the abnormality influencing the setting of the target shifting ratio performed by the setting unit.

5. The control apparatus of the continuously variable transmission according to claim 2, wherein
    the detector detects an abnormality of the microcontroller by determining reasonableness of the target shifting ratio, the abnormality of the microcontroller being the abnormality influencing the setting of the target shifting ratio performed by the setting unit.

6. The control apparatus of the continuously variable transmission according to claim 3, wherein
    the detector detects an abnormality of the microcontroller by determining reasonableness of the target shifting ratio, the abnormality of the microcontroller being the abnormality influencing the setting of the target shifting ratio performed by the setting unit.

7. The control apparatus of the continuously variable transmission according to claim 1, further comprising a drive source controller configured to control output torque of a drive source output member, wherein
    the continuously variable transmission further includes a torque converter and a forward reverse switching mechanism, the torque converter being able to be coupled to the drive source output member, the forward reverse switching mechanism including a forward clutch that feeds the output torque to the continuously variable transmission unit, the output torque being fed from the torque converter, and
    the shifting controller keeps the hydraulic pressure in the hydraulic pressure supplier to be equal to or greater than a clutch pressure at which the forward clutch serves as a torque fuse.

8. The control apparatus of the continuously variable transmission according to claim 2, further comprising a drive source controller configured to control output torque of a drive source output member, wherein
    the continuously variable transmission further includes a torque converter and a forward reverse switching mechanism, the torque converter being able to be coupled to the drive source output member, the forward reverse switching mechanism including a forward clutch that feeds the output torque to the continuously variable transmission unit, the output torque being fed from the torque converter, and the shifting controller keeps the hydraulic pressure in the hydraulic pressure supplier to be equal to or greater than a clutch pressure at which the forward clutch serves as a torque fuse.

9. The control apparatus of the continuously variable transmission according to claim 3, further comprising a drive source controller configured to control output torque of a drive source output member, wherein
the continuously variable transmission further includes a torque converter and a forward reverse switching mechanism, the torque converter being able to be coupled to the drive source output member, the forward reverse switching mechanism including a forward clutch that feeds the output torque to the continuously variable transmission unit, the output torque being fed from the torque converter, and
the shifting controller keeps the hydraulic pressure in the hydraulic pressure supplier to be equal to or greater than a clutch pressure at which the forward clutch serves as a torque fuse.

10. The control apparatus of the continuously variable transmission according to claim 7, wherein the shifting controller requests the drive source controller to reduce the output torque.

11. The control apparatus of the continuously variable transmission according to claim 8, wherein the shifting controller requests the drive source controller to reduce the output torque.

12. The control apparatus of the continuously variable transmission according to claim 9, wherein the shifting controller requests the drive source controller to reduce the output torque.

13. The control apparatus of the continuously variable transmission according to claim 10, wherein
the torque converter includes a first revolution member and a second revolution member, the first revolution member being coupled to the drive source output member, the second revolution member being coupled to the continuously variable transmission unit, the second revolution member being brought into contact with the first revolution member and able to revolve synchronously with the first revolution member, and
the drive source controller keeps the output torque that causes a slip occurring between the first revolution member and the second revolution member to be avoided.

14. The control apparatus of the continuously variable transmission according to claim 11, wherein
the torque converter includes a first revolution member and a second revolution member, the first revolution member being coupled to the drive source output member, the second revolution member being coupled to the continuously variable transmission unit, the second revolution member being brought into contact with the first revolution member and able to revolve synchronously with the first revolution member, and
the drive source controller keeps the output torque that causes a slip occurring between the first revolution member and the second revolution member to be avoided.

15. The control apparatus of the continuously variable transmission according to claim 12, wherein
the torque converter includes a first revolution member and a second revolution member, the first revolution member being coupled to the drive source output member, the second revolution member being coupled to the continuously variable transmission unit, the second revolution member being brought into contact with the first revolution member and able to revolve synchronously with the first revolution member, and
the drive source controller keeps the output torque that causes a slip occurring between the first revolution member and the second revolution member to be avoided.

16. The control apparatus of the continuously variable transmission according to claim 7, wherein
the continuously variable transmission unit includes a primary pulley, a secondary pulley, and a power feeding member, the primary pulley being able to revolve by an output derived from an output shaft of the torque converter, the power feeding member feeding the revolution of the primary pulley to the secondary pulley, and
a first clamp pressure to be applied to the primary pulley and a second clamp pressure to be applied to the secondary pulley are each acquired when the hydraulic pressure in the hydraulic pressure supplier is equal to or greater than a first value, the first clamp pressure being able to suppress a slip occurring between the primary pulley and the power feeding member, the second clamp pressure being able to suppress a slip occurring between the secondary pulley and the power feeding member.

17. The control apparatus of the continuously variable transmission according to claim 10, wherein
the continuously variable transmission unit includes a primary pulley, a secondary pulley, and a power feeding member, the primary pulley being able to revolve by an output derived from an output shaft of the torque converter, the power feeding member feeding the revolution of the primary pulley to the secondary pulley, and
a first clamp pressure to be applied to the primary pulley and a second clamp pressure to be applied to the secondary pulley are each acquired when the hydraulic pressure in the hydraulic pressure supplier is equal to or greater than a first value, the first clamp pressure being able to suppress a slip occurring between the primary pulley and the power feeding member, the second clamp pressure being able to suppress a slip occurring between the secondary pulley and the power feeding member.

18. The control apparatus of the continuously variable transmission according to claim 13, wherein
the continuously variable transmission unit includes a primary pulley, a secondary pulley, and a power feeding member, the primary pulley being able to revolve by an output derived from an output shaft of the torque converter, the power feeding member feeding the revolution of the primary pulley to the secondary pulley, and
a first clamp pressure to be applied to the primary pulley and a second clamp pressure to be applied to the secondary pulley are each acquired when the hydraulic pressure in the hydraulic pressure supplier is equal to or greater than a first value, the first clamp pressure being able to suppress a slip occurring between the primary pulley and the power feeding member, the second clamp pressure being able to suppress a slip occurring between the secondary pulley and the power feeding member.

19. A continuously variable transmission comprising:
a hydraulic pressure supplier containing a hydraulic fluid;

a continuously variable transmission unit able to perform continuously variable shifting by a hydraulic pressure in the hydraulic pressure supplier;

a plurality of revolution number sensors;

a shifting controller including a setting unit configured to set a target shifting ratio of the continuously variable transmission unit on a basis of driving information of a vehicle on which the continuously variable transmission unit is to be mounted, the shifting controller including a microcontroller, the shifting controller being configured to perform a shifting control to cause, by controlling the hydraulic pressure in the hydraulic pressure supplier, a shifting ratio of the continuously variable transmission unit to come close to the target shifting ratio; and a detector configured to detect an abnormality, the abnormality influencing setting of the target shifting ratio performed by the setting unit, wherein the detector determines presence of the abnormality when the detector detects at least one of an abnormality of the microcontroller and an error of any of the revolution number sensors, the shifting controller being configured to cause, when the detector detects the abnormality, the hydraulic pressure in the hydraulic pressure supplier to fall within a range that is equal to or greater than a first value and less than a second value, the first value being a value at which minimal operation performed by the continuously variable transmission unit is available, the second value being a value upon normal operation before the detector detects the abnormality.

20. A method of controlling a continuously variable transmission, the continuously variable transmission including a continuously variable transmission unit, a shifting controller and a plurality of revolution number sensors, the continuously variable transmission unit being able to perform continuously variable shifting by a hydraulic pressure in a hydraulic pressure supplier, the shifting controller including a setting unit configured to set a target shifting ratio of the continuously variable transmission unit on a basis of driving information of a vehicle on which the continuously variable transmission unit is to be mounted, the shifting controller including a microcontroller, the shifting controller being configured to perform a shifting control to cause, by controlling the hydraulic pressure in the hydraulic pressure supplier, a shifting ratio of the continuously variable transmission unit to come close to the target shifting ratio, the method comprising:

detecting an abnormality that influences setting of the target shifting ratio performed by the setting unit, determining presence of the abnormality when detecting at least one of an abnormality of the microcontroller and an error of any of the revolution number sensors; and causing, when the abnormality is detected, the hydraulic pressure in the hydraulic pressure supplier to fall within a range that is equal to or greater than a first value and less than a second value, the first value being a value at which minimal operation performed by the continuously variable transmission unit is available, the second value being a value upon normal operation before the abnormality is detected.

* * * * *